United States Patent
Schertz

[15] 3,635,171
[45] Jan. 18, 1972

[54] CONTINUOUS DOUGHNUT-MAKING MACHINE

[72] Inventor: Eugene P. Schertz, Wakefield, Mass.

[73] Assignee: Dunkin' Donuts Incorporated, Quincy, Mass.

[22] Filed: Apr. 8, 1970

[21] Appl. No.: 26,684

[52] U.S. Cl..............................................425/200, 107/14 E
[51] Int. Cl.................................................A21c 11/16
[58] Field of Search..............107/69, 68, 54 C, 27, 28, 29 R, 107/29 A, 4 R, 4 A, 14 R, 14 E

[56] References Cited

UNITED STATES PATENTS

| | | | |
|---|---|---|---|
| 1,506,232 | 8/1924 | Fleming | 107/54 C |
| 1,789,051 | 1/1931 | Opitz | 107/28 X |
| 1,854,148 | 4/1932 | Hunter | 107/14 E |
| 2,663,478 | 12/1953 | Jahn et al. | 107/28 X |
| 2,915,992 | 12/1959 | Gilmore | 107/14 E |

Primary Examiner—James R. Boler
Attorney—W. R. Hulbert

[57] ABSTRACT

In a continuous doughnut-making apparatus including a dough developer, a pump for forwarding dough-making ingredients to and through the developer and a depositor for receiving developed dough from the developer and forming it into doughnut form, a device is provided for withdrawing samples of developed dough from the apparatus for example for testing or for use in making speciality items, the device providing the samples without interference with the normal operation of the apparatus and being arranged to return all unused dough to the apparatus when sampling is completed.

10 Claims, 4 Drawing Figures

DOUGH IN

SAMPLE OUT

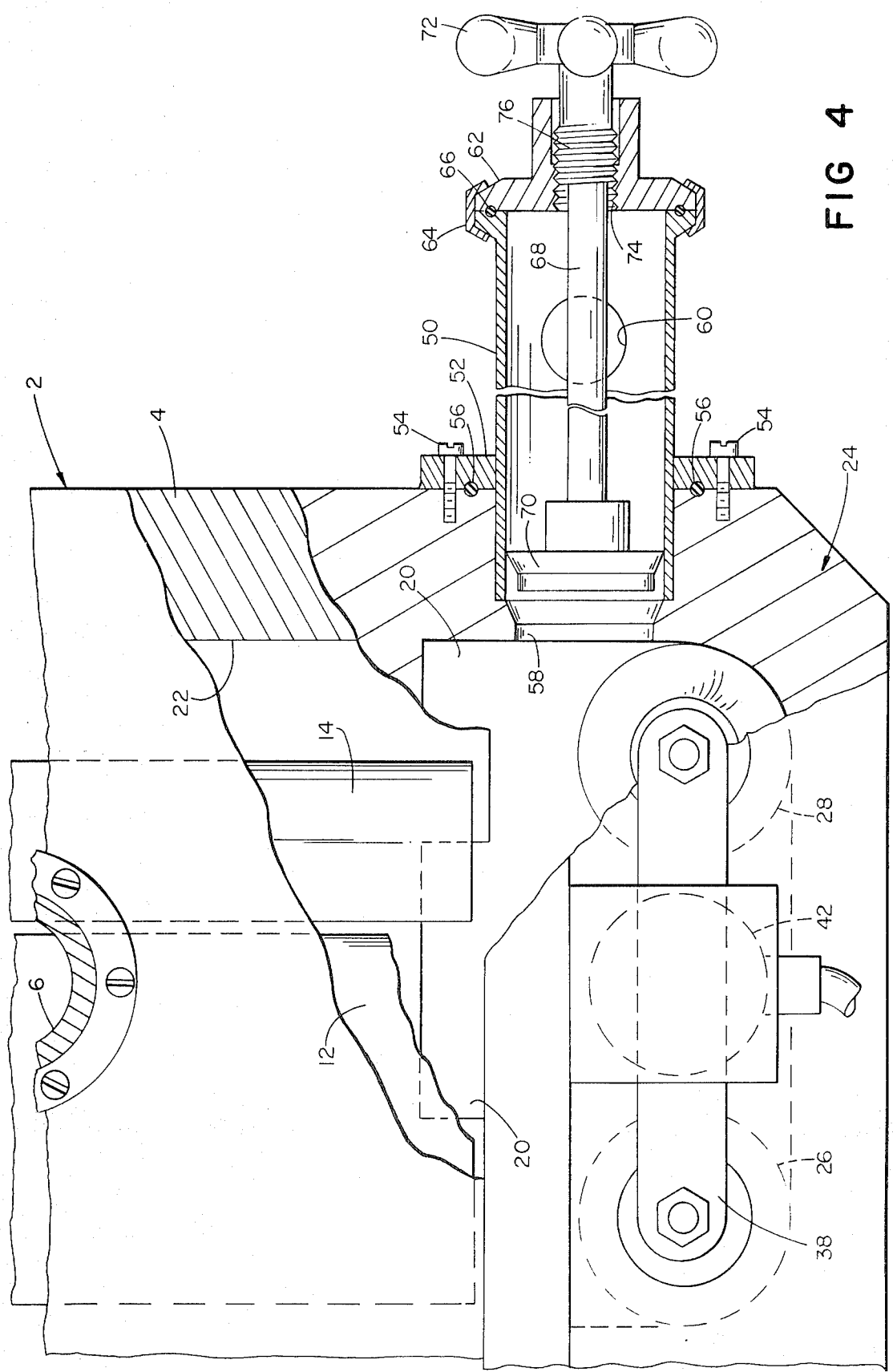

CONTINUOUS DOUGHNUT-MAKING MACHINE

The present invention relates to an apparatus for making doughnuts, and more particularly to a device for withdrawing samples of dough from the apparatus in a machine of this character which is continuous in operation.

When doughnuts are cut from the dough by hand, as is common practice, the remaining scrap dough is useful for forming fancy or specialty items of other shapes than doughnut shape which are made by hand to the desired special shape. In the continuous type of doughnut-making machine with which the invention is concerned all of the dough is utilized for making the doughnuts and there is no scrap available. Further, with such a continuous machine it is advantageous for the operator to be able, if he wishes, to take a sample of the dough for testing purposes, for example as an aid in the operation of the apparatus. The present invention provides a device for use with such continuous doughnut-making apparatus which makes it possible for the operator conveniently to draw off a desired quantity of the developed dough for such purposes as making of speciality or fancy items or for examination. This is accomplished without interference with the normal operation of the apparatus and, further, when the desired sample has been obtained, the device returns all unused dough into the mainstream of dough being processed without leaving in the device dough which might become sour or otherwise spoil and detract from the desired high level of sanitation which the apparatus affords.

An object of the invention is to provide a device for withdrawing samples of developed dough from a continuous doughnut-making apparatus.

Another object of the invention is to provide such a sampling device which will provide such samples while the machine is in normal operation without interference with such normal operation.

Another object of the invention is to provide such a sample withdrawing device which is highly sanitary.

A further object is to provide such a sampling device in which the amount of sample dough withdrawn can be accurately controlled by the operator so that wasting of dough is avoided.

Other objects, features, and advantages of the invention will become apparent from the following description of an illustrative embodiment of the invention in which reference is made to the accompanying drawing wherein FIG. 1 is a perspective view of the apparatus partly broken away;

FIG. 4 is a plan view of the same apparatus partly broken away and in section.

The invention provides a device for withdrawing samples of developed dough from a continuous doughnut-making apparatus which includes a dough developer, a pump for advancing a mixture of dough-forming ingredients to and through the developer and a depositor for forming dough issuing from the developer into doughnut form, the sample withdrawing device comprising a tube extending from the exterior of a wall of the apparatus having developed dough adjacent its inner surface and having a passageway admitting such dough to the interior of the tube, a valve slideable inside the tube longitudinally thereof, said tube having an opening in the wall thereof adjacent to but spaced from its outer end, a plunger within said tube having its inner end connected to said valve and its outer end outside the outer end of said tube, and a closure member for the outer end of said tube having a central opening therein for receiving and guiding said plunger for moving said valve in said tube between positions disposed inwardly of said opening and other positions disposed outwardly of said opening.

Figure 1:
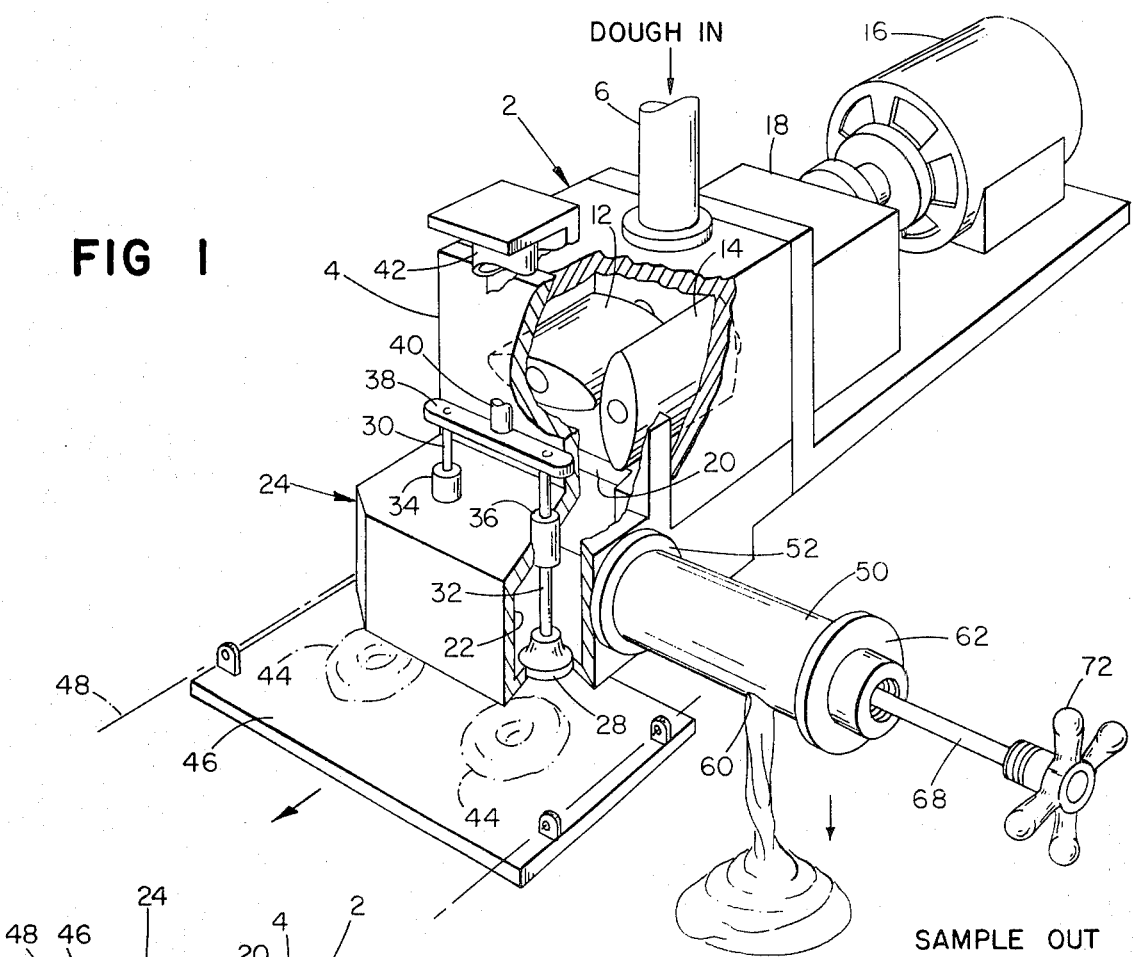
Figure 2:
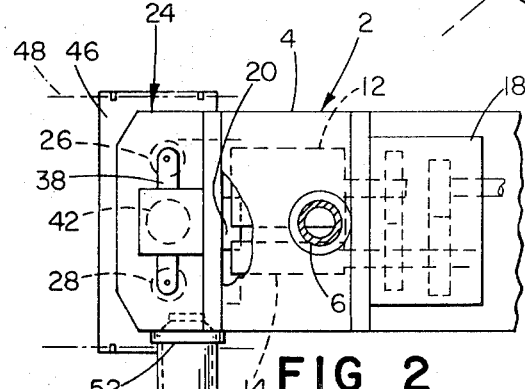
FIG. 2 is a plan view of a part of the apparatus of FIG. 1.
Figure 3:
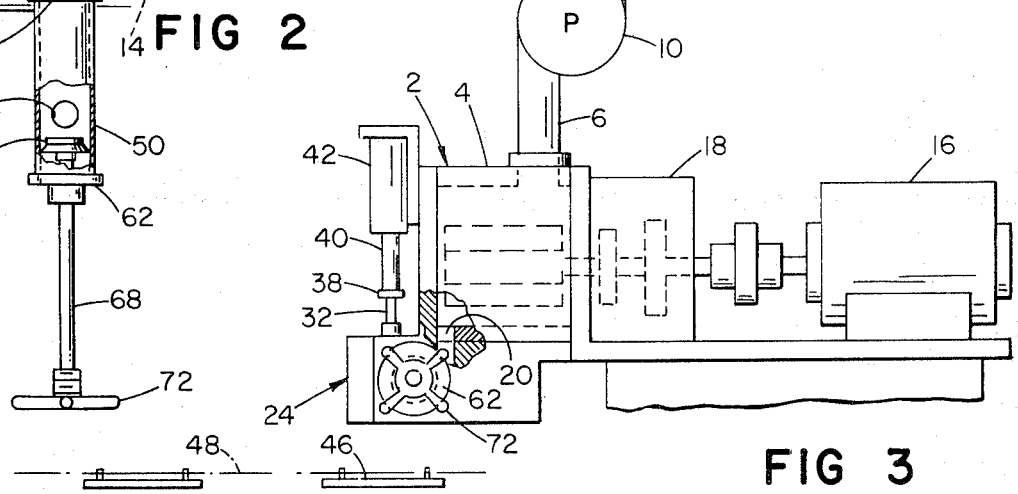
FIG. 3 is a side elevation of the same apparatus.

Referring now to the specific illustrative embodiment of the invention shown in the drawing, FIG. 1 shows the general organization of the apparatus and the relationship of the improvements of the invention thereto. As shown the apparatus includes a developer indicated generally at 2 in the form of a chamber 4 into which the undeveloped dough, or dough-making ingredients, are admitted through a pipe 6. The ingredients, including flour, water, yeast or baking powder are initially mixed in a suitable mixing apparatus (not shown) from which they are continuously advanced through a pipe 8 by a pump 10 to the pipe 6 which admits them to the developer. As apparatus for continuously processing dough making ingredients through the development stage for the purpose of making bread is known in the art, as shown for example in the Baker U.S. Pat. No. 2,953,460 of Sept. 20, 1960, only so much of the apparatus as is necessary to show the relationship of the invention to the developer has been shown. Inside the developer chamber 4 are a pair of paddles 12, 14 supported for rotation on horizontal shafts and driven by a motor 16 through suitable reduction gearing 18. In the developer chamber 4 the dough-making ingredient, or dough, moves downwardly past the paddles 12, 14 and out of the chamber 4 through a passageway 20. In the chamber 4 the dough is worked by the paddles 12, 14 to a suitably developed condition.

From the exit passageway 20 of the developer 2 the developed dough enters the chamber 22 of the depositor indicated generally at 24. In the chamber 22 the developed dough continues to be maintained under pressure by the pump 10. The developed dough leaves the depositor from its bottom in the form of rings in the general shape of doughnuts, ready to be proofed, if proofing is needed. For this purpose the depositor 24 is provided with a pair of vertically moveable cutters or dies 26, 28. The cutters 26, 28 are carried on stems 30, 32 respectively, which stems are vertically slideable in bearings 34, 36 in the upper wall of the chamber of the depositor 24. The stems 30, 32 are fixed at their upper ends in a yoke 38. The yoke 38 in turn is secured to the lower end of a piston rod 40 having at its upper a piston (not shown) moving in a fluid-pressure cylinder 42. The cylinder 42 and its piston are operated by suitable controls to reciprocate each of the cutters 26, 28 vertically between a position within the opening in the bottom wall of the depositor 24, as shown in FIG. 1, to a position below the opening, permitting dough under the pressure of pump 10 to issue through the openings in the form of a cylinder surrounding the die 26 or 28. As the die rises it cuts off the cylinder of dough to form a ring 44 of dough generally in the shape of a doughnut.

The rings 44 fall on a plate 46 of a suitable conveyor indicated diagrammatically at 48 by which the rings are moved away from the depositor, there being a series of successive plates 46 to receive the successive rings as they are deposited by the depositor 24. It is apparent from the foregoing description that the apparatus converts all of the dough into doughnut rings so that there is no scrap dough left over to be available for making special or fancy items as is the case when the dough is cut by hand. The invention provides means whereby such extra dough can be obtained, conveniently and under sanitary conditions, when desired, by means of the device now to be described.

A cylindrical tube 50 is mounted as shown in FIG. 4 in a bore in the front sidewall of the depositor chamber 24. A flange 52 fixed to the tube 50 lies flat against the outer surface of the depositor wall when the tube is fully seated in the bore and this flange is fastened to the depositor 24 by removable cap screws 54 to detachably secure the tube 50 in place. O-rings 56 are provided to insure a tight seal between the tube and the depositor. A counterbore 58 is located as shown in FIG. 4 to provide communication between the interior of the chamber 22 of the depositor and the interior of the tube 50 whereby the developed dough under the pressure of the pump 10 may flow into the tube 50. An opening 60 in the lower side of the tube 50 adjacent to but spaced from its outer end provides an exit for the dough from the tube 50.

The tube 50 is provided at its outer end with a closure member 62 detachably secured to the tube 50 in any suitable manner as by means of the spring clip 64, the O-ring 66 being provided to assure a tight seal between the closure member 62 and the tube 50. The closure member 62 is provided with a central bore through which passes the plunger 68 carrying on its inner end a valve 70 of the appropriate size and shape to fit snugly against the interior surface of the tube 50 and to seat in the valve seat provided by the counterbore 58, which may be provided with cylindrical and conical portions as shown in FIG. 4. The plunger 68 carries on its outer end, which lies exteriorly of the outer end of the tube 50, a suitable handle 72. By means of the handle 72 the valve 70 may be moved to its extreme inward position, where it is tightly seated on the valve seat at 58, and may be moved outwardly in the tube 50 to a position between the opening 60 and the closure member 62 to permit developed dough to issue from the opening 60. The central opening in the closure member 62 is provided with internal threads 74 which cooperate with external threads 76 on the plunger 68. When the desired sample has been withdrawn, the valve 70 may be moved toward its innermost position by pushing inward on the handle 72 until the threads 76 engage with the thread 74 whereupon rotation of the handle 72 will close the valve 70 into its final seated position on the valve seat at 58 and thereafter retain the valve in closed position. As the valve 70 moves to such closed position, it pushes all of the dough remaining within the tube 50 back into the interior of the depositor 24 so that no dough is left in the tube 50 to become sour and contaminate the dough during the next sampling operation. This feature is very important from the sanitation viewpoint. Further, the entire assembly of tube 50 valve 70 and its associated operating plunger 68 and handle 72 may be readily removed from the apparatus when desired for the purpose of cleaning. The removed assembly may be completely disassembled for cleaning. When this assembly is removed, the valve seat at 58 is exposed so that it is readily accessible for cleaning purposes.

Accordingly, by means of the device of the invention the operator may obtain a sample at any time he wants and of whatever quantity is desired by a very simple operation which does not interfere with the normal continuous operation of the doughnut making apparatus. This result is achieved with apparatus which is simple, sanitary and reliable and which does not introduce hazard of spoiled sample dough being returned into the apparatus.

What is claimed is:

1. In a continuous doughnut-making apparatus including a dough developer, a pump for advancing a mixture of dough-forming ingredients to and through the developer, and a depositor for forming dough issuing from the developer into doughnut form, in combination with said developer a device for withdrawing samples of developed dough comprising a tube extending from the exterior of a wall of the apparatus having developed dough adjacent its inner surface, and having a passageway admitting such dough to the interior of said tube, a valve slideable inside said tube longitudinally thereof, said tube having an opening in the wall thereof adjacent but spaced from its outer end, a plunger within said tube having its inner end connected to said valve and its outer end outside the outer end of said tube, and a closure member for the outer end of said tube having a central opening therein for receiving and guiding said plunger for moving said valve in said tube between positions disposed inwardly of said opening and other positions disposed outwardly of said opening.

2. The apparatus of claim 1 further including a valve seat on said apparatus adjacent the inner end of said tube on which said valve seats in its innermost position.

3. The apparatus of claim 1 wherein said tube is detachable from and attachable to the apparatus.

4. The apparatus of claim 1 wherein said closure member is provided with means cooperating with means on said plunger for maintaining said plunger in its innermost position.

5. The apparatus of claim 4 wherein said closure member is removable from and attachable to said tube.

6. The apparatus of claim 1 wherein said tube is mounted on a wall of the depositor.

7. The apparatus of claim 2 wherein said tube is detachable from and attachable to the apparatus.

8. The apparatus of claim 7 wherein said closure member is provided with means cooperating with means on said plunger for maintaining said plunger in its innermost position.

9. The apparatus of claim 8 wherein said closure member is removable from and attachable to said tube.

10. The apparatus of claim 9 wherein said tube is mounted on a wall of the depositor.

* * * * *